(12) United States Patent
Wilhelmsson et al.

(10) Patent No.: US 10,778,260 B2
(45) Date of Patent: Sep. 15, 2020

(54) METHOD AND APPARATUS FOR ENERGY EFFICIENT TRANSMISSION AND RECEPTION OF A SIGNAL USING ALIASING

(71) Applicant: Telefonaktiebolaget LM Ericsson (publ), Stockholm (SE)

(72) Inventors: Leif Wilhelmsson, Dalby (SE); Miguel Lopez, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 179 days.

(21) Appl. No.: 16/088,179

(22) PCT Filed: Apr. 20, 2018

(86) PCT No.: PCT/EP2018/060224
§ 371 (c)(1),
(2) Date: Sep. 25, 2018

(87) PCT Pub. No.: WO2019/201452
PCT Pub. Date: Oct. 24, 2019

(65) Prior Publication Data
US 2020/0212941 A1    Jul. 2, 2020

(51) Int. Cl.
*H04B 1/00* (2006.01)
*H04L 27/18* (2006.01)

(52) U.S. Cl.
CPC .......... *H04B 1/0025* (2013.01); *H04L 27/18* (2013.01)

(58) Field of Classification Search
CPC .... H04B 1/00–0042; H04B 1/10–1027; H04L 5/0058–0064; H04L 27/18; H04L 27/38–3881; H04L 41/0896
See application file for complete search history.

(56) References Cited

U.S. PATENT DOCUMENTS

| | | | | |
|---|---|---|---|---|
| 4,893,341 A | * | 1/1990 | Gehring | H03D 1/2254 |
| | | | | 329/356 |
| 5,633,684 A | * | 5/1997 | Teranishi | H04N 19/63 |
| | | | | 375/240.11 |

(Continued)

FOREIGN PATENT DOCUMENTS

EP    2259465 A1    12/2010

OTHER PUBLICATIONS

Shellhammer, S. et al., "Regulations and Noise Figure—Impact on SNR", doc.: IEEE 802.11-17/0365r0, Mar. 8, 2017, pp. 1-8.

(Continued)

*Primary Examiner* — James M Perez
(74) *Attorney, Agent, or Firm* — Coats & Bennett, PLLC

(57) ABSTRACT

A method of transmitting a signal in a wireless communication network from a transmitting device to a receiving device, wherein said receiving device comprises an Analog to Digital Converter, ADC, arranged to sample a received signal at a predetermined sampling frequency. The method comprising the steps of generating 20, by said transmitting device, said transmission signal, wherein a bandwidth of said transmission signal is such that aliasing components will be created by said ADC upon sampling said transmission signal, and wherein said transmission signal is generated in such a way that the aliasing components have a same phase as a corresponding sampled low frequency component of said transmission signal thereby contributing constructively to said low frequency component of said transmission signal, and transmitting 40, by said transmitting device, said transmission signal to said receiving device.

26 Claims, 3 Drawing Sheets

(56) References Cited

U.S. PATENT DOCUMENTS

| | | | | |
|---|---|---|---|---|
| 5,793,801 | A * | 8/1998 | Fertner | H04B 3/23 375/219 |
| 5,834,985 | A * | 11/1998 | Sundeg.ang.rd | H03C 3/00 332/100 |
| 6,603,362 | B2 * | 8/2003 | Von Dolteren, Jr. | H03L 7/087 327/107 |
| 7,433,433 | B2 * | 10/2008 | Wilhelmsson | H04L 25/0222 375/350 |
| 7,474,611 | B2 * | 1/2009 | Svensson | H04L 25/0216 370/203 |
| 7,907,673 | B2 * | 3/2011 | Wilhelmsson | H04L 1/20 375/260 |
| 7,929,624 | B2 * | 4/2011 | Lindoff | H04J 11/0069 375/260 |
| 8,249,129 | B2 * | 8/2012 | Fudge | H04B 1/7136 341/152 |
| 8,605,827 | B2 * | 12/2013 | Valadon | H04L 7/0054 375/329 |
| 8,634,494 | B2 * | 1/2014 | Bai | H03F 1/3247 375/297 |
| 8,761,280 | B1 * | 6/2014 | Harris | H04L 27/2602 375/259 |
| 8,791,849 | B1 * | 7/2014 | Marr | H03M 1/66 341/143 |
| 9,100,963 | B2 * | 8/2015 | Hui | H04W 72/0446 |
| 9,497,061 | B2 * | 11/2016 | Morris | H03F 3/24 |
| 2002/0084856 | A1 * | 7/2002 | Von Dolteren, Jr. | H03L 7/16 331/1 A |
| 2003/0072393 | A1 * | 4/2003 | Gu | H04L 27/364 375/322 |
| 2004/0057509 | A1 * | 3/2004 | Porat | H04L 12/12 375/222 |
| 2005/0105647 | A1 * | 5/2005 | Wilhelmsson | H04L 25/0234 375/316 |
| 2006/0128343 | A1 * | 6/2006 | Leblond | H04B 1/28 455/313 |
| 2006/0239178 | A1 * | 10/2006 | Svensson | H04L 25/0232 370/208 |
| 2007/0183535 | A1 * | 8/2007 | Maravic | H04B 1/707 375/316 |
| 2009/0322578 | A1 * | 12/2009 | Petrovic | H04B 1/0039 341/155 |
| 2010/0226458 | A1 * | 9/2010 | Dent | H04L 25/0202 375/296 |
| 2013/0202068 | A1 * | 8/2013 | Ly-Gagnon | H04W 52/0225 375/343 |
| 2013/0243121 | A1 * | 9/2013 | Bai | H03F 3/245 375/297 |
| 2014/0050133 | A1 * | 2/2014 | Jafarian | H04W 52/02 370/311 |
| 2014/0213206 | A1 * | 7/2014 | Morris | H04L 27/368 455/226.1 |
| 2015/0247910 | A1 * | 9/2015 | Riederer | G01R 33/5619 324/309 |
| 2016/0285598 | A1 * | 9/2016 | Ling | H03M 1/0629 |
| 2016/0373237 | A1 * | 12/2016 | Shellhammer | H04L 27/2675 |
| 2017/0332327 | A1 * | 11/2017 | Fang | H04L 5/0007 |
| 2018/0287644 | A1 * | 10/2018 | Burykh | H04B 1/10 |

OTHER PUBLICATIONS

Park, M. et al., "Low-Power Wake-Up Receiver (LP-WUR) for 802.11", doc.: IEEE 802.11-15/130741, Nov. 10, 2015, pp. 1-18.

Wilhelmsson, L. et al., "Concurrent transmission of data and a wake-up signal in 802.11ax", doc.: IEEE 802.11-17/0094r1, Jan. 15, 2017, pp. 1-11.

* cited by examiner

METHOD AND APPARATUS FOR ENERGY EFFICIENT TRANSMISSION AND RECEPTION OF A SIGNAL USING ALIASING

TECHNICAL FIELD

The disclosure generally relates to the field of Telecommunication and more particularly to improving energy efficiency of transceivers in telecommunication systems. The disclosure particularly relates to a method, and apparatus thereof, for improving energy efficiency of a wake-up receiver.

BACKGROUND

Energy efficient transmission and reception are becoming increasingly important within the field of wireless communications. The main reason for this is the expected massive growth of low cost devices for Internet of Things, IoT.

Energy efficiency can mean two different things. On the one hand, it may refer to the transmitter side and that one should be able to transmit the information using as low power as possible, either just to save energy or because there may be regulatory limitations for what is allowed. On the other hand, it may refer to the energy needed to receive the signal. Typically, one can trade the power consumption in the transmitter and the receiver in the sense that it is often possible to achieve reliable communications at lower transmission power by allowing a higher complexity and power consumption in the receiver. The higher complexity typically implies that efficient forward error correcting codes are used, such as e.g. convolutional codes, low density parity check codes, or so-called Turbo codes.

One approach for achieving low power consumption in a device is to use so-called Wake-Up Receivers, WURs, sometimes also referred to as wake-up radios, in combination with a Primary Radio, or a primary receiver. These WURs provide a means to significantly reduce the power consumption in receivers used in wireless communication. The idea with a WUR is that it can be based on a very relaxed architecture, as it only needs to be able to detect the presence of a wake-up signal, but will not be used for any data reception. The Primary receiver is then arranged for data reception.

A commonly used modulation for the Wake-Up Signal, WUS, i.e., the signal sent to the WUR, is On-Off Keying, OOK. OOK is a binary modulation, where a logical one is represented with sending a signal, ON, whereas a logical zero is represented by not sending a signal, OFF.

There are currently activities ongoing in the Institute of Electrical and Electronics Engineers, IEEE, 802.11 task group named IEEE 802.11ba to standardize the Physical layer, PHY, and the Link Layer, MAC, for a Wake-Up Radio to be used as a companion radio to the main 802.11 radio with the mere purpose to significantly reduce the power consumption.

It is proposed to generate the WUS by using an Inverse Fast Fourier transform, IFFT, as this block is already available in Wi-Fi transmitters supporting 802.11a/g/n/ac, for example. Specifically, an approach discussed for generating the OOK is to use the 13 sub-carriers in the center, and then populating these with some signal to represent ON and to not transmit anything at all to represent OFF. The IFFT has 64 points and is operating at a sampling rate of 20 MHz, and just as for ordinary Orthogonal Frequency Division Multiplexing, OFDM, a cyclic prefix is added after the IFFT operation in order to keep the OFDM symbol duration used in 802.11a/g/n/ac and thus be able to spoof legacy stations by prepending a legacy preamble at the beginning of the WUS. In this way, legacy stations will be able to detect the WUS and correctly defer access to the wireless medium.

The design of the WUS as described above allows for a very power efficient receiver implementation. However, in order to achieve this, the bandwidth of the signal is limited to about 4 MHz.

To achieve low power consumption in the WUR, it is desirable to use a low sampling rate in the receiver, which translated to having a channel selective filter with a relatively small bandwidth. On the other hand, due to regulatory requirements, the maximum transmission power that can be used is often limited by the Power Spectrum Density, PSD. That is, although a higher total transmission power would be allowed, this cannot be used if the bandwidth of the signal is too small. Since a reduced transmission power directly means that the range of the WUR will be reduced, this results in a trade-off between receiver power consumption and transmission range.

SUMMARY

An object of the invention according to the present disclosure is to be able to transmit a signal with relatively large bandwidth such that the transmitted signal power may be kept high, in turn allowing for high performance at the receiver, still allowing for a low power implementation of a receiver.

In a first aspect of the present disclosure, there is presented a method of transmitting a signal in a wireless communication network from a transmitting device to a receiving device, wherein the receiving device comprises an Analog to Digital Converter, ADC, arranged to sample a received signal at a predetermined sampling frequency. The method according to the first aspect comprises the steps of generating, by said transmitting device, said transmission signal, such that constructive aliasing will occur upon sampling, by the receiver, the received signal. Furthermore, the transmission signal is generated in such a way that the aliasing components have a same phase as a corresponding sampled low frequency component of said transmission signal, thereby contributing constructively to said low frequency component of said transmission signal.

The method according to the first aspect of the disclosure, further comprises the step of transmitting, by the transmitting device, the transmission signal to the receiving device.

An advantage of the invention according to the present disclosure is that it allows for a low power implementation of a receiver, achieved by clocking the ADC and the digital blocks at a low rate, still benefitting from the advantages of a transmitted signal having a large bandwidth. The large bandwidth does here give two advantages. First, it may allow for that a higher transmission power can be used. Second, it allows for that the signal will benefit from better frequency diversity.

According to an embodiment, the wireless communication network employs Orthogonal Frequency Division Multiplexing, OFDM, comprising a plurality of subcarriers, and wherein the step of generating comprises generating said transmission signal such that at least two distinct aliasing components are created by said ADC upon sampling said transmission signal.

In an embodiment, the at least two aliasing components alias with at least two distinct different low frequency components of said transmission signal. This provides a certain degree of diversity in the frequency range of the received aliased signal.

In an embodiment, the generated transmission signal is a Wake-up signal arranged for waking up said receiving device. The method may be advantageously employed in the case of Wake-Up Radios, WURs, which are employed in combination with a Primary radio. The task of the WUR is to listen for a wake-up signal and to wake-up the Primary radio upon receiving such a wake-up signal.

By employing a method according to the present disclosure to generate a wake-up signal, it is possible to ensure that the WUR consumes low power and yet, the wake-up signal meets the regulatory requirements imposed by various regions.

According to an embodiment of the first aspect of the present disclosure, the method further comprises the step of estimating, by said transmitting device, a channel over which said transmission signal is to be transmitted, wherein said channel is estimated for said bandwidth, thereby obtaining channel parameters, and wherein said step of generating comprises generating said transmission signal taken into account said estimated channel parameter.

It is foreseen that in some cases, the channel may not be flat, i.e. the channel over which the signal is transmitted may modify the signal in a particular manner, for example by modifying the phase of the signal. In such cases, the transmitting device estimates the channel parameters by sending a standard test signal. A standard test signal may be a signal of known parameters such as frequency, amplitude, phase etc. Channel parameters may then be estimated by examining the signal received at the receiving device. Once channel parameters are estimated, the signal to be transmitted may be modified before being transmitted in such a way that the effect of the channel on the signal is negated. In other words, the receiver shall receive the signal as generated.

In an embodiment, the step of generating comprises generating said transmission signal by assuming that a coherence bandwidth of a channel over which said transmission signal is to be transmitted is at least said bandwidth. Coherence bandwidth is a statistical measurement of the range of frequencies over which the channel can be considered "flat", or in other words the approximate maximum bandwidth or frequency interval over which two frequencies of a signal are likely to experience comparable or correlated amplitude fading. Therefore, by ensuring that the bandwidth of the signal to be transmitted is sufficiently small compared to the coherence bandwidth provides the advantage that the channel shall remain flat and therefore predictable.

In an embodiment of the first aspect of the present disclosure, the bandwidth and the predetermined frequency are chosen such that a number of aliased components created by said ADC upon sampling said received transmission signal is 1, 3 or 7. The number of aliased components correspond to the under-sampling factor. The under-sampling factor may be defined as the ratio between the bandwidth of a transmitted signal and the sampling frequency of the receiver. The number of aliased components created by the ADC is dependent on the under-sampling factor and the numbers correspond to an under-sampling factor of 2, 4 and 8 respectively.

In an embodiment of the first aspect of the present disclosure, the step of generating comprises generating said transmission signal by using On Off Keying, OOK modulation.

According to an embodiment, the step of generating comprises generating said transmission signal by using Binary Phase Shift Keying, BPSK, or Quadrature Phase Shift Keying, QPSK.

In a second aspect of the invention, there is presented a transmitting device arranged for transmitting a transmission signal in a wireless communication network to a receiving device, wherein said receiving device comprises an Analog to Digital Converter, ADC, arranged to sample a received signal at a predetermined sampling frequency.

The transmitting device further comprises signal generating means, arranged for generating said transmission signal wherein a bandwidth of said transmission signal is higher than half the predetermined sampling frequency such that aliasing components will be created by said ADC upon sampling said transmission signal, and wherein said transmission signal is generated, by said signal generating means, in such a way that the aliasing components have a same phase as a corresponding sampled low frequency component of said transmission signal thereby contributing constructively to said low frequency component of said transmission signal.

The transmitting device further comprises transmitting means, arranged for transmitting the generated transmission signal to the receiving device. It is hereby noted that the terms and definitions associated with the first aspect of the present disclosure, being a method of transmitting a transmission signal also apply to the second aspect being the transmitting device.

In accordance with the present disclosure, different aspects applicable to the above mentioned embodiments of the method, including the advantages thereof, correspond to the aspects which are applicable to the devices according to the present disclosure.

According to an example of the second aspect of the present disclosure, the signal generating means are further arranged for generating said transmission signal such that at least two distinct aliasing components are created by said ADC upon sampling said transmission signal.

In an example, the at least two aliasing components alias such that the aliased components combine with at least two distinct different low frequency components of said transmission signal.

According to an embodiment, the generated transmission signal is a Wake up signal arranged for waking up said receiving device.

In an example, the device further comprises estimating means arranged for estimating a channel over which said transmission signal is to be transmitted, wherein said channel is estimated for said bandwidth, thereby obtaining channel parameters, and wherein said step signal generating means are further arranged for generating said transmission signal taken into account said estimated channel parameter.

According to an embodiment of the second aspect of the present disclosure, the signal generating means are further arranged for generating said transmission signal by assuming that a coherence bandwidth of a channel over which said transmission signal is to be transmitted is at least said bandwidth.

In an embodiment, the bandwidth and the predetermined frequency are chosen such that a number of aliased components created by said ADC upon sampling said received transmission signal is 1, 3 or 7.

In an embodiment of the second aspect of the present disclosure, the signal generating means are further arranged for generating said transmission signal by using On Off Keying, OOK modulation.

According to an embodiment, the signal generating means are further arranged for generating said transmission signal by using Binary Phase Shift Keying, BPSK, or Quadrature Phase Shift Keying, QPSK modulation.

According to the present disclosure, the method is directed in such a way that the ADC of the receiver will construe aliasing components, and that these aliasing components contribute, in a positive manner, to the part of the signal that can be correctly received. The aliasing components appear in the frequency spectrum that is/can be decoded correctly.

This may imply that the aliasing components coincide with the components that can be decoded correctly, or that the aliasing components do not coincide with the original components but that they do constitute at least some sort of useful information for the receiver.

It is further noted that the aliasing components may be generated due to several facts. For example, for sampling in the real domain, the sampling rate should be the Nyquist rate. By choosing the bandwidth higher that the Nyquist bandwidth, aliasing components will be created by the ADC of the received. Another option is that the receiver uses I/Q sampling, for example two samples each time, one for the I component and one for the Q components. It is noted that any person in the art is aware of this concept of how aliasing components are to be created at the receiver side.

It is further noted that the transmission signal can be viewed as the base band signal and/or as the Radio-Frequency signal, i.e. the baseband signal up-mixed to the RF frequency. The RF frequency is, for example, in the order of Gigahertz like 2.4 Ghz up to 60 Ghz or even higher.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

The invention will be presented when being applied to a specific system with specific parameters to more easily describe the core of the invention. As would be obvious for anyone of ordinary skill in the art, the ideas presented here are easily adopted to other systems with potentially very different parameters.

Figure 1:
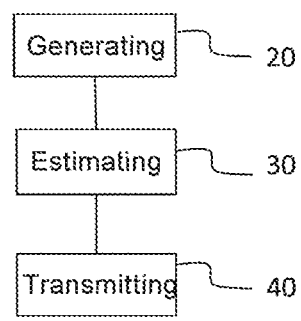
FIG. 1 schematically illustrates a method according to the present disclosure.

FIG. 1 illustrates the steps involved in a method 10 according to the present disclosure. In a first step 20 of generating, a transmitting device generates a transmission signal which is to be transmitted to a receiving device. The transmission signal is generated such that the signal will be under-sampled by the receiving device. The person skilled in the art understands that it may be required to be aware of the sampling frequency or the sampling adopted by the receiving device. This information may be previously known owing to the fact that such sampling rates may be part of a regulatory requirement or the sampling rate may be a standard for a particular type of signal, such as an Radio Frequency, RF signal, or a Frequency Modulation, FM, Radio signal. Alternatively, the receiving device may have sent this information to the transmitting device at an earlier moment in time.

In a step of transmitting 40, the generated signal is transmitted to the receiving device. The method 10 may comprise the optional step 30 of estimating the channel parameters of the channel over which the signal is to be transmitted. This step of estimation 30 may be required when it is known that the channel is not frequency flat—i.e. when the channel introduces amplitude and phase changes to the signal that are different for different frequency parts of the transmitted signal. In such a case, the estimated channel parameters are used to modify the generated signal such that the effects of the frequency dependent changes introduced by the channel may be nullified. In such a case, in the step 40 of transmitting, it is the modified signal that is transmitted by the device.

Suppose that the considered system is based on a standard developed by the Institute of Electrical and Electronics Engineers, IEEE, 802.11 working group (WG), and suppose that the channel bandwidth used is 20 MHz. In some parts of the world, the maximum transmission power that can be used will be limited by the maximum power spectrum density that is allowed, and for this reason it is desirable that the transmitted signal occupies as large part of the 20 MHz channel as possible. It is assumed that the 16 MHz is a reasonable bandwidth to use, leaving 2 MHz of guard band on each side. Furthermore, it is assumed that the On-Off Keying, OOK, signal is generated using a standard 802.11 transmitter architecture using a 64-point Inverse Fast Fourier Transform, IFFT, and a cyclic prefix of 0.8 us. This results in a total symbol duration of 4 us. With Manchester coding the total duration of a bit becomes 8 us and a corresponding data rate of 125 kb/s.

Figure 2:
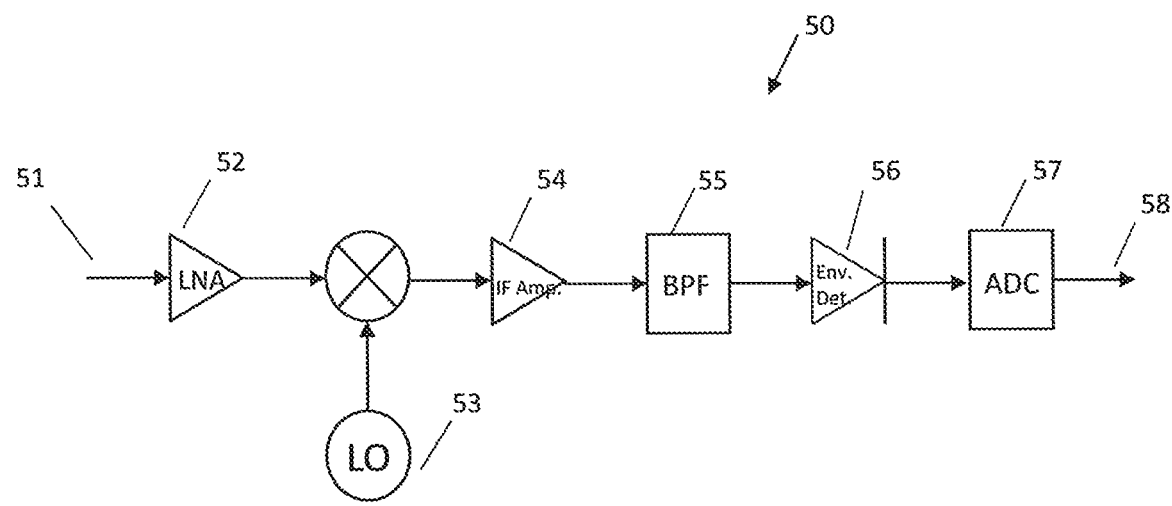
FIG. 2 schematically illustrates an architecture for a receiving device arranged for receiving a signal according to the present disclosure.

The receiver can be implemented in various ways, where the bandwidth of the transmitted signal may impact the architecture to a different degree. One possible architecture 50 is shown in FIG. 2. In this case the envelope detector 56 is in the analog domain, i.e., before the ADC 57. The input signal to the envelope detector 56 is at an intermediate frequency, IF, and is filtered through a Band Pass Filter, BPF, 55 before entering the envelope detector. The bandwidth to the BPF 55 is here matched to the signal bandwidth of the WUS. A nice property of this architecture is that the sampling rate used for the ADC 57 can be selected based on the symbol rate of the signal, i.e., 250 ksymbol/s, rather than the bandwidth which easily can be an order of magnitude larger. In fact, the only component that would be changed in case the bandwidth would be altered is the BPF 55.

Architectures different from the one shown in FIG. 2 for a receiver using an envelope detector are conceivable. For example, in some architectures, the envelope detector 56 may be placed after the ADC 57 whereby the envelope detector 56 will be in the digital domain.

What is noteworthy in the discussion above is that the information rate is typically much smaller than the bandwidth. Very often in wireless communications, the information rate is higher than the bandwidth, so that the spectrum efficiency is more than 1 bit per second, b/s, per Hz. In the examples above, the spectrum efficiency would typically be less than 0.1 b/s per Hz. In fact, this may be viewed as the very same information is sent in parallel on different frequency channels such that the total bandwidth is significantly increased without increasing the information rate.

The gain is, of course, that the total received power may be significantly increased. In either case, the power of the above mentioned parallel channels are combined non-coherently, i.e., the power that reaches the envelope detector is doubled for every doubling of signal bandwidth provided the Power Spectral Density, PSD, remains the same.

What can be noted is that since the signal is modulated using OOK, the aliasing that is caused by clocking the ADC 57 at a rate much lower than the bandwidth is not really a problem since what is to be detected is only whether there is a signal present or not. The part of the signal that is aliased will thus contain energy if the signal is ON, but no energy when the signal is OFF. Since the Signal to Noise Ratio, SNR, typically would be similar over the whole bandwidth, and since noise is aliased in a similar way as the signal, aliasing would not change the SNR. The key thing to observe here is that both the signal and the noise are added non-coherently as it may typically be assumed that the phase of the aliased signals are uncorrelated with the signal not being aliased.

However, since aliasing of a signal is both deterministic and predictable, it is possible to construct a signal such that the signal will be aliased in a coherent way, i.e., they will add up with the same phase such that the aliased component will effectively cause constructive interference. Since the noise of aliased signal is uncorrelated with the non-aliased signal, this means that one in this way can improve the signal to noise ratio that reaches the envelope detector, which of course in this case has to be implemented in the digital domain due to that the aliasing as such is generated in the ADC.

An embodiment of the present disclosure relates to the construction of a transmitted signal, which when aliased has the property that the high frequency components may constructively interfere with low frequency. If the channel between the transmitter and receiver is the same over the entire bandwidth, it is straight-forward to construct the signal since the aliasing is completely deterministic once it is known what sampling frequency is used at the receiver.

The construction is here made such that the aliased components of the signal will have the same phase as the low frequency component of the signal and therefore adds constructively or coherently.

As indicated previously, in some regulatory jurisdictions, the maximum allowed transmission power cannot be used if the bandwidth of the signal is too small because in addition to a restriction on the maximum allowed transmission power there is also a restriction on the maximum power spectrum density of the signal, which in case of a small signal bandwidth will result in a harder requirement on the total power that can be transmitted. One possible way around this restriction is to use interlaced or comb-like frequency domain patterns in the transmitted signal which spread the signal over the available bandwidth, which is then larger than the instantaneous bandwidth of the transmitted signal, while muting some subcarriers and boosting the power of some other subcarriers. An example of such a pattern is illustrated by reference number 100 in FIG. 3a.

Figure 3A:
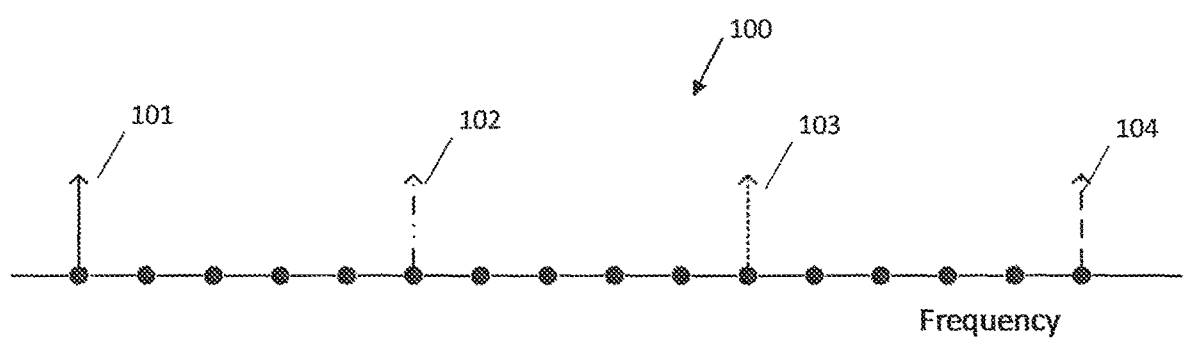
FIGS. 3a, 3b schematically illustrate an exemplary embodiment of aliasing according to the present disclosure.

In this way, the maximum output power can be employed at the transmitter. According to an embodiment of the invention, the transmitter formats the frequency domain signal utilizing comb pattern 100 such that after aliasing, no two different subcarriers are aliased to the same sub-carrier. In FIG. 3a, the dots indicate the position of the sub-carrier in an OFDM system. The arrows 101, 102, 103, 104 indicate the non-muted subcarriers and the dashed lines are used to label the subcarriers.

Figure 3B:
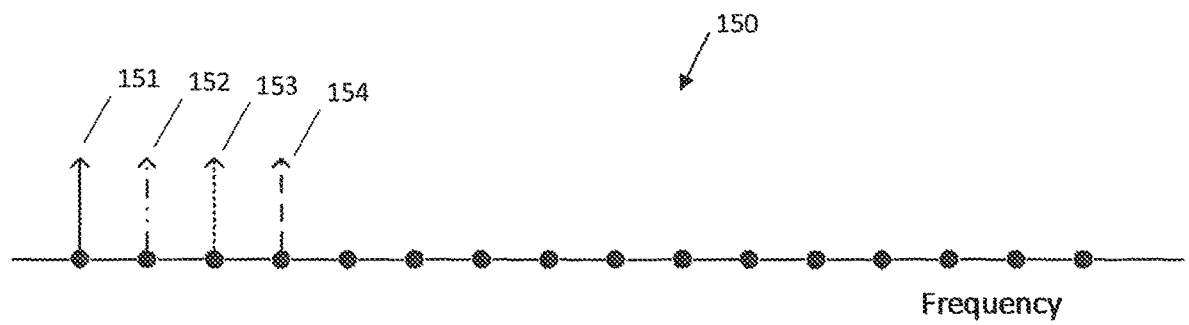

Assuming that the signal 100 in FIG. 3a is under-sampled by a factor of 4 at the receiver, the aliased received signal 150 shall have a frequency domain representation as shown in FIG. 3b. Compared to FIG. 3a, it is clear how the subcarriers 101, 102, 103, 104 have been designed so that any aliased component falls where there is no other signal component so as to generate the perceived low-bandwidth signal comprising components 151, 152, 153, 154.

The following description illustrates how the invention can be implemented. Suppose that the ON signal is generated using an OFDM transmitter. The continuous time, baseband transmitted signal x(t) can be expressed in the following form:

$$x(t) = \sum_{k=0}^{K-1} S_k \exp(j2\pi k \cdot \Delta f \cdot t); 0 \leq t \leq T.$$

Here K is the total number of subcarriers, $\Delta f$ is the subcarrier spacing, $S_k$ are the frequency domain symbols, T is the OFDM symbol duration (without cyclic prefix) and $T_{CP}$ is the cyclic prefix duration. The nominal sampling rate is $F_s = \Delta f \cdot K = K/T$. For example, K=64, $\Delta f$=312.5 kHz, T=3.2 us, $F_s$=20 MHz, and $S_k$ drawn from a QAM constellation correspond to parameters used in an 802.11 OFDM transmitter. Often, some of the frequency symbols $S_k$ are set to zero, in order to build a guard band, or to suppress the DC component of the signal.

Suppose that the number of subcarriers K is factored and written in the form K=N·M, where N represents an under-sampling factor. In order to see the effect of aliasing due to under sampling by a factor N, it is convenient to re-index the subcarriers. Any subcarrier index k can be expressed in a unique way through a pair p, q such that $$k = pM + q; \quad 0 \leq p \leq N-1; \quad 0 \leq q \leq M-1$$

Using this notation, the transmitted baseband signal x(t) can be re-written as $$x(t) = \sum_{q=0}^{M-1} \sum_{p=0}^{N-1} S_{pM+q} \exp(j2\pi(pM + q) \cdot \Delta f \cdot t).$$

After propagation through a channel with impulse response h(t) and corresponding discrete frequency response taps $H_k$, corresponding to the frequency response sampled at the frequencies $\Delta f \cdot k$, the received signal perturbed by additive noise w(t) can be expressed in the following form:

$$y(t) = (x * h)(t) + w(t) = \sum_{q=0}^{M-1} \sum_{p=0}^{N-1} H_{pM+q} S_{pM+q} \exp(j2\pi(pM+q) \cdot \Delta f \cdot t) + w(t).$$

The received digital signal $y_d(n)$, sampled at the nominal sampling rate $F_s$ is $$y_d(n) \triangleq y\left(n \cdot \frac{1}{F_s}\right) = y\left(n \cdot \frac{T}{K}\right) = y\left(n \cdot \frac{1}{\Delta f \cdot K}\right) = y\left(n \cdot \frac{1}{\Delta f \cdot M \cdot N}\right).$$

Replacing t by n·1/$F_s$ in the expression for y(t), and simplifying, it is seen that $$y_d(n) = \sum_{q=0}^{M-1}\sum_{p=0}^{N-1} H_{pM+q}S_{pM+q}\exp\left(j2\pi(pM+q)\cdot\Delta f\cdot n\cdot\frac{1}{\Delta f\cdot M\cdot N}\right)+w(n)$$

$$y_d(n) = \sum_{q=0}^{M-1}\sum_{p=0}^{N-1} H_{pM+q}S_{pM+q}\exp\left(j2\pi\frac{(p\cdot M+q)\cdot n}{M\cdot N}\right)+w(n)$$

The impact of aliasing due to under sampling by a factor of N can be understood by looking at the expression for the under sampled digital signal $y_u(n)$:

$$y_u(n) \triangleq y_d(n\cdot N).$$

The expression $y_u(n)$ corresponds to the output of the ADC 57 in FIG. 2. In other words, $y_u(n)$ is the expression for the output of the ADC 57 when the ADC 57 runs at a rate slower than the nominal sampling frequency $F_s$ and the under-sampling factor is N. It can be evaluated by replacing n by n*N in the expression for the received digital signal $y_d$.

$$y_u(n) =$$

$$y_d(n\cdot N) = \sum_{q=0}^{M-1}\sum_{p=0}^{N-1} H_{pM+q}S_{pM+q}\exp\left(j2\pi\frac{(p\cdot M+q)\cdot n\cdot N}{M\cdot N}\right)+w(n),$$

$$y_u(n) = \sum_{q=0}^{M-1}\sum_{p=0}^{N-1} H_{pM+q}S_{pM+q}\exp(j2\pi p\cdot p\cdot n)\exp\left(j2\pi\frac{q\cdot n}{M}\right)+w(n).$$

Since $$\exp(j2\pi p\cdot p\cdot n)=1,$$

then $$y_u(n) = \sum_{q=0}^{M-1}\exp\left(j2\pi\frac{q\cdot n}{M}\right)\sum_{p=0}^{N-1} H_{pM+q}S_{pM+q}+w(n).$$

Note that since the summands in the term $$\sum_{p=0}^{N-1} H_{pM+q}S_{pM+q}$$

are complex valued, destructive interference can occur, i.e. the sum can have a small or even zero amplitude.

In one embodiment of the invention, the frequency domain symbols $S_k$ are chosen as follows. First, M arbitrary frequency domain symbols $A_q$, $0 \leq q \leq M-1$ are chosen. These can be BPSK, QPSK, QAM symbols. If the channel coefficients $H_{pM+q}$ are known at the transmitter, the frequency domain symbols $S_k$ are set in the transmitter as $$S_{pM+g} \triangleq P_0 H_{pM+q}^+ A_q,$$

$0 \leq p \leq N-1$; $0 \leq q \leq M-1$.

The factor $P_0$ is an arbitrary positive constant used to control the output power. It can be used, for example, to normalize the average transmitted power.

With this choice, the output of the ADC 57 can be written as $$y_u(n) = \sum_{q=0}^{M-1}\exp\left(j2\pi\frac{q\cdot n}{M}\right)\sum_{p=0}^{N-1} P_0 H_{pM+q}H_{pM+q}^* A_q + w(n).$$

For convenience, one can write $$R_q \triangleq P_0^2 \sum_{p=0}^{N-1} |H_{pM+q}|^2,$$

so that $$y_u(n) = \sum_{q=0}^{M-1}\exp\left(j2\pi\frac{q\cdot n}{M}\right)A_q R_q + w(n).$$

The term $R_q$ is real and positive. In this way, destructive interference is avoided. There are other choices for the transmitted frequency domain symbols that avoid destructive interference due to aliasing at the receiver. For example, as discussed in 5.2, the choice $$S_{pM+q} \triangleq P_0 \exp(-j\cdot\arg(H_{pM+q}))A_q,$$

where arg(x) denotes the argument of the complex number x, also results in elimination of the destructive interference at the output of the ADC. The calculations are almost identical to those above.

Consider the special case where the channel is flat. This means that the channel frequency response is constant, so that $H_k = C$ for some complex constant C. In this case, the frequency domain transmitted symbols are simply $S_{pM+q} \triangleq A_q$ for $0 \leq p \leq N-1$, $0 \leq q \leq M-1$. The output of the ADC is $$y_u(n) = C\sum_{q=0}^{M-1}\exp\left(j2\pi\frac{q\cdot n}{M}\right)\sum_{p=0}^{N-1} A_q + w(n) = C\sum_{q=0}^{M-1}\exp\left(j2\pi\frac{q\cdot n}{M}\right)NA_q.$$

In contrast, if the frequency domain symbols were arbitrary, the output of the ADC would be $$y_u(n) = C\sum_{q=0}^{M-1}\exp\left(j2\pi\frac{q\cdot n}{M}\right)\sum_{p=0}^{N-1} S_{pM+q} + w(n).$$

Assuming that all the frequency domain symbols $S_{pM+q}$ and $A_q$ have unit power, it can be observed that since $$E\left[\left|\sum_{p=0}^{N-1} S_{pM+q}\right|^2\right] = N, \text{ and } E[|A_q N|^2] = N^2,$$

the invention gives an increase by N of the Signal to Noise Ratio, SNR, in the under-sampled received signal.

Finally, if the channel is not known at the transmitter, one can still choose the transmitted frequency domain symbols in a way that destructive interference is avoided. The method can be visualized as follows. Arrange the frequency domain symbols in a table as shown below. The rows correspond to constant values of q, while the columns correspond to constant values of p.

| q/p     | p = 0     | p = 1       | ...  | p = N − 1            |
|---------|-----------|-------------|------|----------------------|
| q = 0   | $S_0$     | $S_M$       | ...  | $S_{(N-1)M}$         |
| q = 1   | $S_1$     | $S_{M+1}$   | ...  | $S_{(N-1)M+1}$       |
| q = 2   | $S_2$     | $S_{M+2}$   | ...  | $S_{(N-1)M+2}$       |
| ...     | ...       | ...         |      | ...                  |
| q = M − 2 | $S_{M-2}$ | $S_{M+(M-2)}$ |   | $S_{(N-1)M+(M-2)}$   |
| q = M − 1 | $S_{M-1}$ | $S_{M+(M-1)}$ |   | $S_{(N-1)M+(M-1)}$   |

The terms in row number q contain all the frequency domain symbols included in the sum $\Sigma_{p=0}^{N-1} H_{pM+q} S_{pM+q}$, which contains the terms that may cause destructive interference. The idea is to choose only one frequency domain symbol from each row, and set the others to zero. In this way, each sum $\Sigma_{p=0}^{N-1} H_{pM+q} S_{pM+q}$ contains only one non-zero term and there is no destructive interference. This can be realized in several ways. For example, define a sequence c(q), 0≤q≤M−1, where each number c(q) is a randomly chosen integer between 0 and N−1. That is, 0≤c(q)≤N−1, and choose also M arbitrary frequency domain symbols $A_q$, 0≤q≤M−1. These can be BPSK, QPSK, QAM symbols. Define $$S_{pM+q} \triangleq \begin{cases} NA_q & \text{if } p = c(q) \\ 0 & \text{otherwise} \end{cases}.$$

The factor N is added in order to keep the signal power constant, since for each non-zero symbol $S_{pM+q}$, there are N−1 zeroed symbols. With this choice of the transmitted frequency domain symbols, the destructive interference is eliminated $$\sum_{p=0}^{N-1} H_{pM+q} S_{pM+q} = H_{c(q)M+q} S_{c(q)M+q} = H_{c(q)M+q} NA_q,$$

$$0 \leq q \leq M - 1.$$

Hence the output of the ADC is $$y_u(n) = \sum_{q=0}^{M-1} \exp\left(j2\pi \frac{q \cdot n}{M}\right) \sum_{p=0}^{N-1} H_{pM+q} S_{pM+q} + w(n)$$

$$= \sum_{q=0}^{M-1} \exp\left(j2\pi \frac{q \cdot n}{M}\right) H_{c(q)M+p} NA_q + w(n).$$

As before, it is seen that the destructive interference arising from the term $$\sum_{p=0}^{N-1} H_{pM+q} S_{pM+q}$$

is avoided and the average SNR increased by a factor of N.

Figure 4:
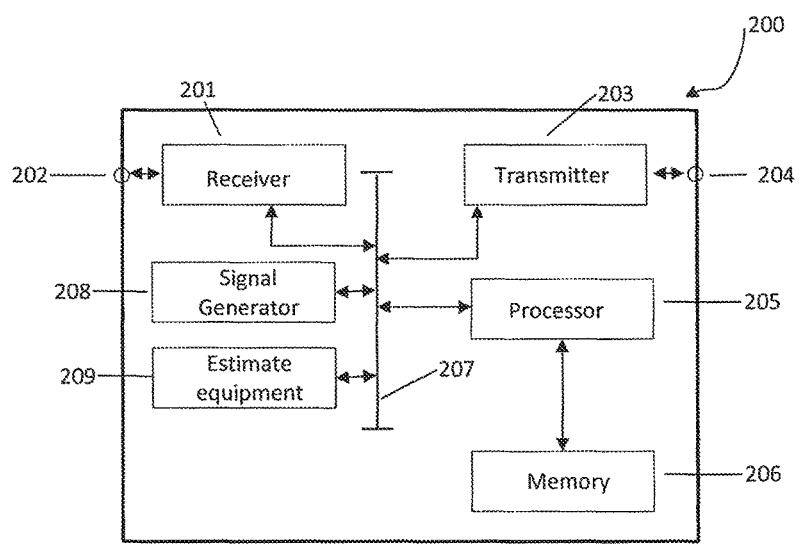
FIG. 4 schematically illustrates a transmitting device according to the present disclosure.

FIG. 4 illustrates a transmitting device 200 according to the present disclosure. The device 200 comprises a receiver 201, 202 arranged to receive signals from other devices in the communication network. The device 200 also comprises transmitting means 203, 204 arranged to transmit signal to other devices in the communication network. It may be understood by the skilled person that the receiver 201, 202 and transmitter 203, 204 are separately shown merely for illustrative purposes. The combined functionality may be achieved by a transceiver, for example.

The transmitting device 200 further comprises a signal generator 208 which is arranged to generate a signal according to the present disclosure such that the signal will be under-sampled by the receiving device generating aliased components of the transmitted signal. The device 200 may optionally also comprise estimate equipment 209 arranged to estimate parameters of a channel (not shown) over which a generated signal is transmitted to a receiving device.

The transmitting device 200 further comprises processor 205 and memory 206. The memory may be arranged to store a computer program product which when executed by the processor 205 causes the device 200 to perform a method according to the present disclosure. The internal components communicate with one another using an internal bus 207.

Other variations to the disclosed examples can be understood and effected by those skilled in the art in practicing the claimed disclosure, from a study of the drawings and disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of transmitting a transmission signal in a wireless communication network from a transmitting device to a receiving device, wherein the receiving device comprises an Analog to Digital Converter (ADC) arranged to sample a received signal at a predetermined sampling frequency, the method comprising the transmitting device:
   generating the transmission signal, wherein a bandwidth of the transmission signal is selected such that aliasing components will be created by the ADC upon sampling the transmission signal, and wherein the transmission signal is generated in such a way that the aliasing components have a same phase as a corresponding sampled low frequency component of the transmission signal that is not aliased, thereby contributing constructively to the low frequency component of the transmission signal; and
   transmitting the transmission signal to the receiving device.

2. The method of claim 1, wherein the generating comprises generating the transmission signal such that at least two distinct aliasing components are created by the ADC upon sampling the transmission signal.

3. The method of claim 2:
wherein the wireless communication network employs Orthogonal Frequency Division Multiplexing (OFDM) comprising a plurality of subcarriers; and
wherein the generating comprises generating the transmission signal using OFDM.

4. The method of claim 2, wherein the at least two aliasing components alias with at least two distinct different low frequency components of the transmission signal.

5. The method of claim 1, wherein the generated transmission signal is a Wake-up signal arranged for waking up the receiving device.

6. The method of claim 1:
further comprising estimating, by the transmitting device, a channel over which the transmission signal is to be transmitted, wherein the channel is estimated for the bandwidth, thereby obtaining channel parameters; and
wherein the generating comprises generating the transmission signal taken into account the channel parameters.

7. The method of claim 1, wherein the generating comprises generating the transmission signal by assuming that a coherence bandwidth of a channel over which the transmission signal is to be transmitted is at least the bandwidth.

8. The method of claim 1, wherein the bandwidth and the predetermined sampling frequency are chosen such that a number of aliased components created by the ADC upon sampling the received transmission signal is 1, 3, or 7.

9. The method of claim 1, wherein the generating comprises generating the transmission signal by using On Off Keying (OOK).

10. The method of claim 1, wherein the generating comprises generating the transmission signal by using Binary Phase Shift Keying (BPSK) or Quadrature Phase Shift Keying (QPSK).

11. A transmitting device arranged for transmitting a transmission signal in a wireless communication network to a receiving device, wherein the receiving device comprises an Analog to Digital Converter (ADC) arranged to sample a received signal at a predetermined sampling frequency, the transmitting device comprising:
processing circuitry;
memory containing instructions executable by the processing circuitry whereby the transmitting device is operative to:
generate the transmission signal, wherein a bandwidth of the transmission signal is selected to be higher than half the predetermined sampling frequency such that aliasing components will be created by the ADC upon sampling the transmission signal, and wherein the transmission signal is generated in such a way that the aliasing components have a same phase as a corresponding sampled low frequency component of the transmission signal, wherein a frequency of the low frequency component is smaller than two times the predetermined sampling frequency, thereby contributing constructively to the low frequency component of the transmission signal; and
transmit the generated transmission signal to the receiving device.

12. The transmitting device of claim 11, wherein the instructions are such that the transmitting device is operative to generate the transmission signal such that at least two distinct aliasing components are created by the ADC upon sampling the transmission signal.

13. The transmitting device of claim 12:
wherein the wireless communication network employs Orthogonal Frequency Division Multiplexing (OFDM) comprising a plurality of subcarriers; and
wherein the instructions are such that the transmitting device is operative to the generated transmission signal to the receiving device using OFDM.

14. The transmitting device of claim 12, wherein the at least two aliasing components alias with at least two distinct different low frequency components of the transmission signal.

15. The transmitting device of claim 11, wherein the generated transmission signal is a Wake up signal arranged for waking up the receiving device.

16. The transmitting device of claim 11, wherein the instructions are such that the transmitting device is operative to:
estimate a channel over which the transmission signal is to be transmitted, wherein the channel is estimated for the bandwidth, thereby obtaining channel parameters; and
generate the transmission signal taking into account the channel parameters.

17. The transmitting device of claim 11, wherein the instructions are such that the transmitting device is operative to generate the transmission signal by assuming that a coherence bandwidth of a channel over which the transmission signal is to be transmitted is at least the bandwidth.

18. The transmitting device of claim 11, wherein the bandwidth and the predetermined sampling frequency are chosen such that a number of aliased components created by the ADC upon sampling the received transmission signal is 1, 3, or 7.

19. The transmitting device of claim 11, wherein the instructions are such that the transmitting device is operative to generate the transmission signal by using On Off Keying (OOK) modulation.

20. The transmitting device of claim 11, wherein the instructions are such that the transmitting device is operative to generate the transmission signal by using Binary Phase Shift Keying (BPSK) or Quadrature Phase Shift Keying (QPSK) modulation.

21. A non-transitory computer readable recording medium storing a computer program product for controlling transmission of a transmission signal in a wireless communication network from a transmitting device to a receiving device, wherein the receiving device comprises an Analog to Digital Converter (ADC) arranged to sample a received signal at a predetermined sampling frequency, the computer program product comprising software instructions which, when run on processing circuitry of the transmitting device, causes the transmitting device to:
generate the transmission signal by the transmitting device, wherein a bandwidth of the transmission signal is selected such that aliasing components will be created by the ADC upon sampling the transmission signal, and wherein the transmission signal is generated in such a way that the aliasing components have a same phase as a corresponding sampled low frequency component of the transmission signal that is not aliased, thereby contributing constructively to the low frequency component of the transmission signal; and
transmit the transmission signal to the receiving device.

22. A system for transmitting a transmission signal from a transmitting device to a receiving device in a wireless communication network, the system comprising:

the receiving device; the receiving device configured to use envelope detection, the receiving device comprising an Analog to Digital Converter (ADC) arranged to sample a received signal at a predetermined sampling frequency;

the transmitting device; the transmitting device comprising:

processing circuitry;

memory containing instructions executable by the processing circuitry whereby the transmitting device is operative to:

generate the transmission signal, wherein a bandwidth of the transmission signal is higher than half the predetermined sampling frequency such that aliasing components will be created by the ADC upon sampling the transmission signal, and wherein the transmission signal is generated in such a way that the aliasing components have a same phase as a corresponding sampled low frequency component of the transmission signal, wherein a frequency of the low frequency component is smaller than two times the predetermined sampling frequency, thereby contributing constructively to the low frequency component of the transmission signal; and transmit the generated transmission signal to the receiving device.

23. The system of claim 22, wherein the instructions are such that the transmitting device is operative to generate the transmission signal such that at least two distinct aliasing components are created by the ADC upon sampling the transmission signal.

24. The system of claim 23, wherein the at least two aliasing components alias with at least two distinct different low frequency components of the transmission signal.

25. The system of claim 22, wherein the generated transmission signal is a Wake up signal arranged for waking up the receiving device.

26. The system of claim 22, wherein the bandwidth and the predetermined sampling frequency are chosen such that a number of aliased components created by the ADC upon sampling the received transmission signal is 1, 3, or 7.

* * * * *